July 13, 1965  R. T. FLORA  3,194,943
SEMI-AUTOMATIC WELDING GUN
Filed Oct. 22, 1962  3 Sheets-Sheet 1

INVENTOR
RUSSELL T. FLORA
BY *Toulmin & Toulmin*
ATTORNEYS

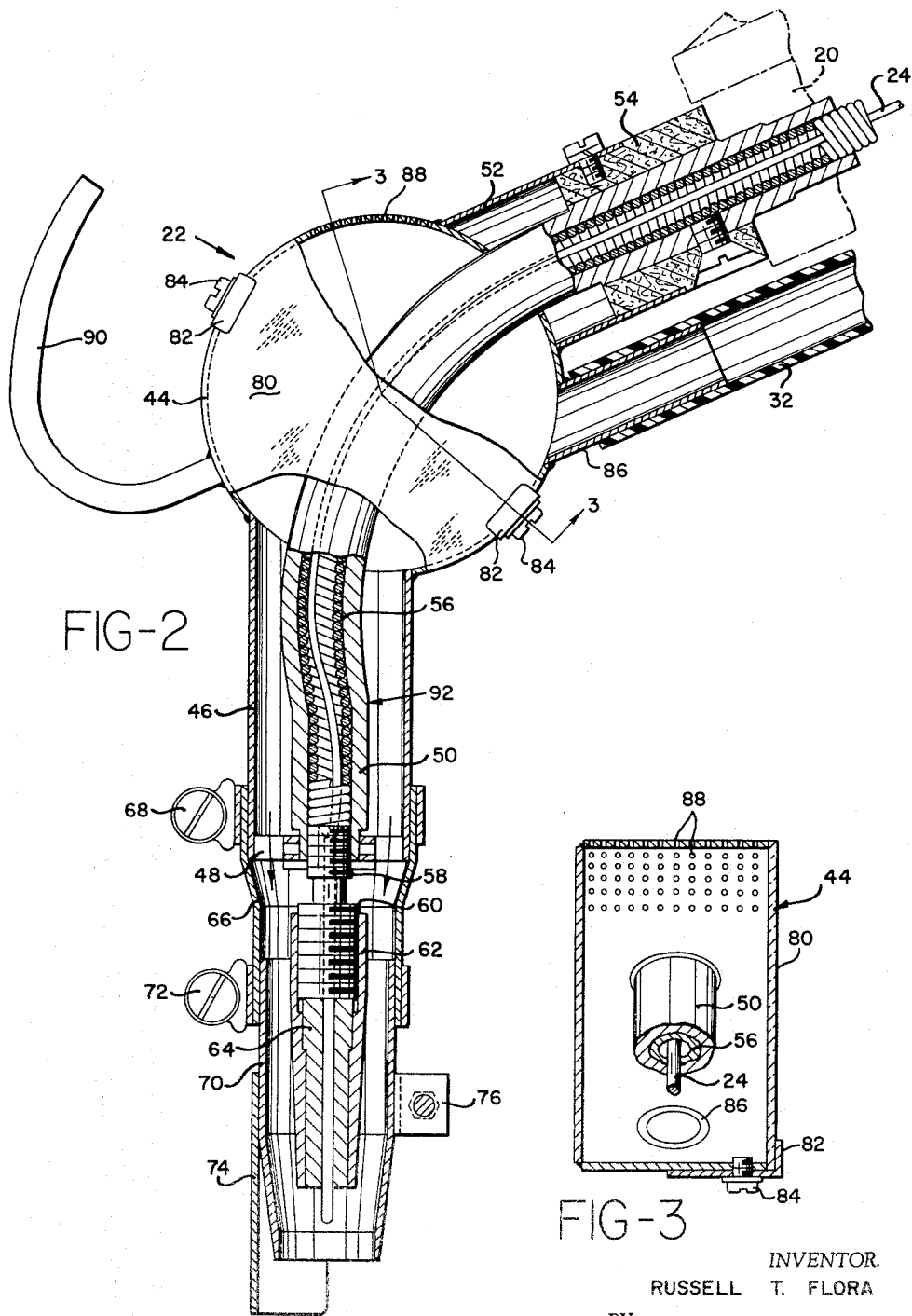

United States Patent Office 3,194,943
Patented July 13, 1965

3,194,943
SEMI-AUTOMATIC WELDING GUN
Russell T. Flora, Tipp City, Ohio, assignor to Hobart Brothers Company, Troy, Ohio, a corporation of Ohio
Filed Oct. 22, 1962, Ser. No. 232,140
10 Claims. (Cl. 219—130)

This invention relates to a welding gun and particularly to a welding gun for use in connection with submerged arc welding.

Guns of the general nature with which the present invention is concerned are known and consist, generally, of a gun adapted for being held in the hand of the welder and through which gun is fed a consumable welding electrode, such as a wire. A shielding gas may also be fed through such a gun and, still further, such guns customarily have a flux material fed therethrough that is disposed on the weld region as the gun is moved.

It is in particular connection with the feeding of the granulated flux material that the present invention is concerned. The feeding of flux through welding guns has been the subject of considerable research and it has been found that there is a great advantage in effecting a uniform controllable flow of flux through a hand held gun while, at the same time, the flow of the flux through the gun can be readily terminated at the end of a welding operation.

The gun of the present invention accomplishes the foregoing objectives in a relatively simple inexpensive compact unit which can easily be held in the hand without imposing any great additional amount of weight on the welder, on account of the flux in the gun, while tilting of the gun upwardly at the end of a welding operation will cause immediate cessation of the flow of flux through the gun.

A particular feature of the gun of the present invention is to be found in the fact that the flow of flux through the gun is observable by the welder so any non-uniformity in the flux flow or any interruption thereof can be detected in advance of the time that the said non-uniformity or interruption would interfere with conditions at the weld region.

In connection with submerged arc welding utilizing a hand gun, it follows that if the weld region is properly blanketed by flux material, the exact region where the welding is taking place is completely concealed and this can lead to some difficulty in directing the welding electrode into exactly the right region. The gun of the present invention has as an additional feature the provision of a simple arrangement whereby the line to be welded can readily be followed while the gun will be held steady at all times.

The very nature of a hand held welding gun is such that the welding electrode, usually a wire, is fed around a bend as it approaches the exit end of the gun. On account of this, the wire is sometimes bent and may not slide freely through the guide provided therefor at the exit end of the gun. As a still further feature, the gun of the present invention has an arrangement in the supply channel through which the wire or welding electrode passes which tends to remove any bend that has been imparted to the wire in its movement through the curved part of the gun so that it will slide freely through the guide provided therefor from which the wire issues as it approaches the weld region.

The several features outlined above, as well as features and advantages of the gun according to the present invention, will become more apparent upon reference to the following specification, taken in connection with the accompanying drawings, in which:

FIGURE 2 is a side view of the gun partly broken away and drawn at considerably enlarged scale;

FIGURE 3 is a vertical sectional view through a portion of the gun and is indicated by line 3—3 on FIGURE 2;

Figure 1:
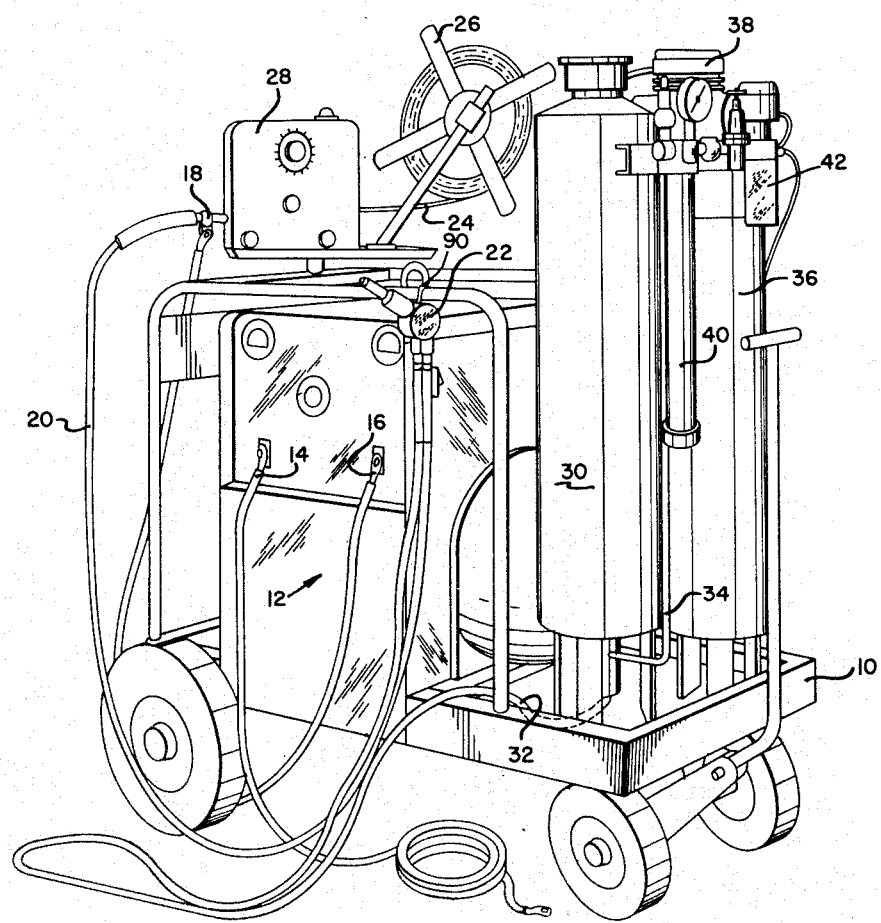
FIGURE 1 is a perspective view showing a typical welding installation adapted for employing in a welding gun according to the present invention.
Figure 4:
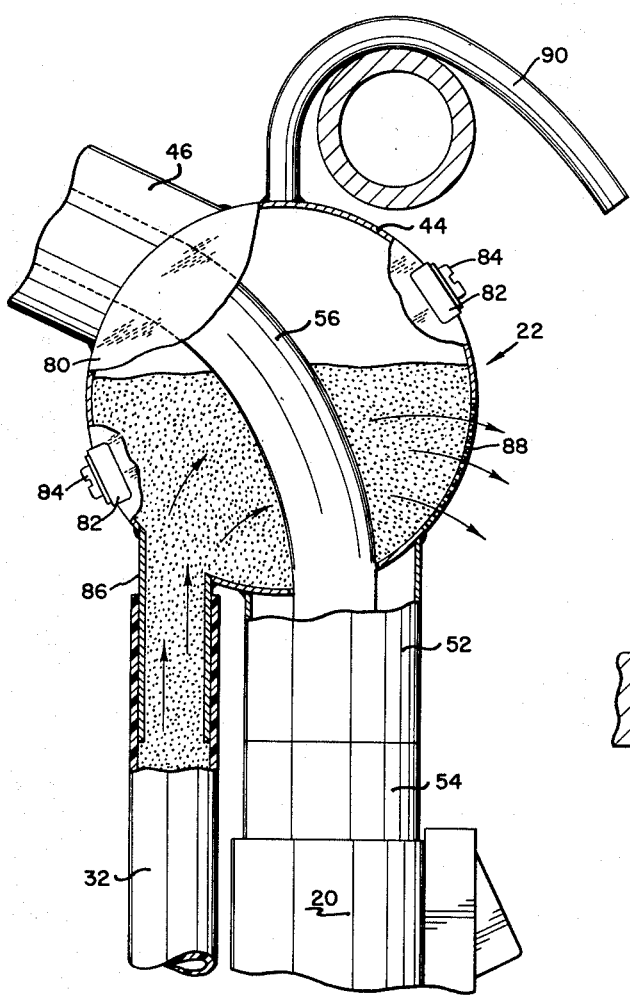
FIGURE 4 is a fragmentary side view of the gun showing it in rest position with the flow of flux therethrough interrupted on account of the position occupied by the gun.

Referring to the drawings somewhat more in detail, the welding rig illustrated in FIGURE 1 comprises a wheeled cart 10 with which is associated a motor generator generally indicated at 12 which may comprise, for example, an alternating current drive motor and a direct current generator. The generator supplies electric power to cables 14 and 16 of which the former is a ground cable and the latter is a cable leading to terminal 18 which is located at the end of a supply cable 20 opposite welding gun 22. A welding transformer supplying alternating current or a transformer-rectifier combination supplying direct current to the cables could also be used.

Cable 20 is a cable through which a welding electrode or wire 24 is to be fed from a supply reel 26 thereof, the feeding of the wire being under the control of a wire feeder 28. Such cables and wire feeders are known in the art.

Also mounted in cart 10 is a container 30 having therein granulated flux material. This flux material is arranged to flow from the bottom of container 30 into a flux line 32 which may be a plastic hose, Teflon, for example, and which hose leads to gun 22 to be connected thereto as will be described hereinafter.

The flux is caused to flow through hose 32 by a supply of compressed gas, such as air, delivered to the lower end of tank 30 via air conduit 34. This air comes from an air tank 36 to which air is supplied by a compressor 38. The air in its movement from the atmosphere through the compressor into tank 36 and then into conduit 34 passes through an air drier 40 and an oil and moisture removing unit 42 so that only dry, clean air is delivered to the flux line.

Turning now to FIGURE 2, the gun 22 is shown more in detail. In FIGURE 2, it will be noted that the gun comprises a central cylindrical chamber 44 from which extends on one side a tube 46 that carries at its outer end a spider 48. Spider 48 supports one end of a tubular element 50 that extends upwardly along tube 46 and through chamber 44 and into and through another tube 52 attached to the outer wall of chamber portion 44.

Within tube 52, the aforementioned tubular portion 50 is fixed to and extends through a block 54 that is arranged for connection to the end of the aforementioned hose 20. Located within tubular portion 50 is a closely coiled guide arrangement 56 through which the aforementioned electrode or wire 24 is fed. At its upper end, the coiled guide 56 is connected to or abuts a corresponding guide in hose 20 so that the wire can be delivered completely through the hose and into guide 56.

At its other end, adjacent spider 48, tubular portion 50 receives the threaded end of a hollow member 58 into which the wire 24 is delivered. Member 58 is threaded at its opposite end at 60 for threadedly receiving a bushing 62 within which is disposed a wire guide member 64. All of the aforementioned members pertaining to the guiding of the wire are metal except the member 64 which may be either metal, such as copper, or a ceramic material, such as aluminum oxide.

The guide member 64 and its supporting bushing extend outwardly a substantial distance beyond the end of the tubular portion 46 and means is provided for enclosing these projecting members and may take the form of a resilient sleeve 66 having one end clamped to tube 46 by clamps 68. At its other end, resilient sleeve 66 is clamped to a nozzle portion 70 by a clamp 72. Nozzle portion 70 tapers inwardly at its discharge end and forms the opening through which the flux being passed through the gun passes to the weld region.

On account of the aforementioned clamps, the nozzle portion 20 can be adjusted relative to the end of the wire guide 64 to determine the amount of projection of the wire from the wire guide before it reaches the weld region.

Figure 5:
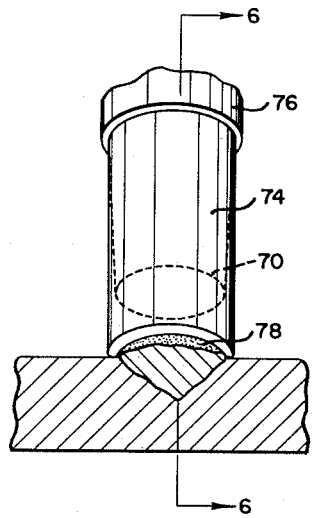
FIGURE 5 is a view showing the tip of the gun in use as the gun is drawn along a region to be welded and is indicated by line 5—5 on FIGURE 6.
Figure 6:
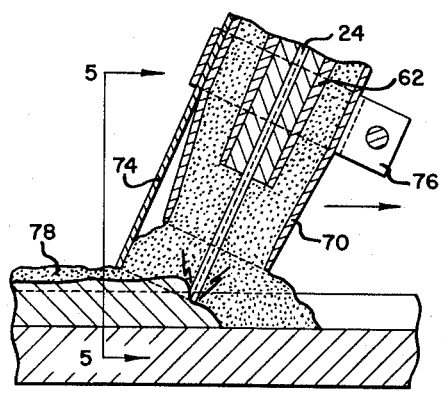
FIGURE 6 is a sectional view indicated by line 6—6 on FIGURE 5.

Clamped on the nozzle portion 70 is a shield 75 arcuate in cross section and held in place adjustably by the clamp means 76. The shield 74 not only assists in directing the flux into the weld region and in making uniform the distribution of the flux in this region, as will be seen in FIGURES 5 and 6, but it also serves to provide a gauge to maintain the correct distance between the gun nozzle and workpiece and to follow the line of the weld.

On account of the slotted ends of tube 66 and associated clamps 68 and 72, the welding wire may be centered to the arc area or slightly offset as needed for local conditions. Being held by the clamp, almost any relationship between the end of the nozzle, the end of the guide, and the shield may be obtained for best welding.

It will be observed that at least one end of the central cylindrical portion 44 of gun 22 is provided with a transparent cover 80 through which the movement of the flux material through the gun can be observed. Any interruption in the movement of the flux material through the gun will thus be observed before the supply of flux to the weld machine halts and the welder can take the necessary steps to insure that shielding will not be continued in the absence of the protective blanket of flux material. This cover, which can be of plastic material, is held on by clips 82 secured to the cylindrical portion of the gun by screws 84.

It has been mentioned that the flux material is conveyed through the flux hose 32 by a vehicle such as air, and the flux material, with the air, enters the cylindrical portion of the gun through an inlet conduit 86 attached to the cylindrical portion at a point spaced circumferentially from the tube nozzle portion.

When the gun is in use, and the gun portion is extended substantially upwardly, the vehicle air escapes from the cylinder through a plurality of apertures 88 through a periphery in the cylindrical portion substantially opposite the connection thereto of the nozzle portion. The flux material delivered to the cylindrical portion will then flow by gravity down the tubular nozzle portion to the weld region.

When the gun is hanging up between supporting hooks 90 attached to the cylindrical portion of the gun, the nozzle points upwardly at an angle, and the flux supply enters the cylindrical portion of the gun in the region of the bottom thereof. At this time, the vehicle air escapes through the apertures 88 and the flux material will rise in the gun only to a predetermined level, and will not pass through the nozzle portion. The flow of flux into the gun is thus interrupted and will not again be resumed until the gun is tilted to permit the flux material to flow by gravity down the nozzle portion thereof. The apertures 88 are smaller than the granulars of flux material so that the flux material does not pass through the apertures when the gun is hanging up.

A further feature of the present invention is to be found in the arrangement of the guide arrangement 56 and its tubular support 58. It will be observed that the wire 24, in passing from the shield and cable 20 into the gun and around the arcuate portion of the guide means and the cylindrical portion of the gun, may acquire a certain amount of weight, which may interfere with the movement of the wire through the wire guide member 64. This is compensated for, according to the present invention, by placing a reverse bend in the guiding means for the wire, as is generally indicated at 92 in FIGURE 2. This tends to straighten out the wire so that it passes freely through the wire guide 64. It would be observed that the nozzle portion of the gun consists of two rigid portions inter-connected by a flexible portion, and that these two rigid portions are adjusted axially relative to each other to provide for the desired projection of the wire between the end of the wire guide member during a welding operation. The shield member 74 is generally adjustable so that it can be placed in the best position as the gun is being used.

The combination according to this invention provides for a gun that provides for a visible supply of flux to the weld region and one in connection with which the flow of flux is relatively uniform and wherein the flux is confined to the immediate area of the weld region. The shield member also serves in guiding the spider while the flexibility of the nozzle end of the gun permits the spider to make necessary adjustments in the path taken by the gun.

It would be understood that this invention is susceptible to modification in order to adapt it to different usages and conditions; and accordingly, it is desired to comprehend such modifications within the invention as may fall within the scope of the appended claims.

I claim:

1. A welding gun for supplying welding wire and granular flux material to a welding region comprising; a tubular portion forming a nozzle for the gun, a cylindrical portion at the end of said tubular portion, guide means extending through said cylindrical portion and said tubular portion and terminating in the region of the end of said nozzle portion for conveying wire to said welding region, conduit means connected to said cylindrical portion for the supply thereto of granular flux material, said flux material being adapted for flowing by gravity through said nozzle portion to said welding region, said cylindrical portion comprising an end wall of transparent material for observation of the flow of flux material through said cylindrical portion, said flux material being conveyed through said conduit means by air, and holes in the periphery of said cylindrical portion spaced from the connection thereto of said nozzle portion for the escape of air from the cylindrical portion.

2. In a welding gun; a cylindrical portion, a tubular nozzle leading substantially radially from said cylindrical portion at one point about the periphery thereof, a conduit connected to the periphery of said cylindrical portion at a point spaced from the connection thereto of said nozzle portion, means extending through said cylindrical portion and along the axis of said nozzle portion to the region of the end of the nozzle portion for supplying welding wire to the weld region at the end of said nozzle portion, means for supplying granular flux material and a gaseous conveying medium through said conduit to said cylindrical portion, apertures in the periphery of said cylinder portion for the escape of gaseous medium therefrom while the flux material flows by gravity from the cylindrical portion through said nozzle portion to said weld region, at least one end of said cylindrical portion being transparent for the observation of the flow of flux material therethrough, the said apertures being arranged in said cylindrical portion in a region generally opposite the connection to said cylindrical portion of said nozzle portion.

3. In a welding gun; a cylinder portion, a tubular nozzle leading substantially radially from said cylinder portion at one point about the periphery thereof, a conduit connected to the periphery of said cylinder portion at a point spaced from the connection thereto of said nozzle portion, means extending through said cylinder portion and along the inside of said nozzle portion to the region of the end thereof for supplying welding wire to a weld region at the end of said nozzle portion, means for supplying granular flux material and a gaseous conveying medium through said conduit to said cylindrical portion, apertures in the periphery of said cylinder portion for the escape of gaseous medium therefrom while the flux material flows by gravity from the cylinder portion through said nozzle portion to the weld region, at least one end of said cylinder portion being transparent for the observation of the flow of flux material therethrough, the said apertures being arranged in said cylinder portion in a region generally opposite the connection to said cylinder portion of said nozzle portion, said nozzle portion extending generally downwardly from said cylinder portion when the gun is in use during a welding operation, said gun having means for hanging it up when not in use with the nozzle portion extending upwardly at an angle from said cylinder portion, and when the gun is hanging up the said apertures permitting the escape of gas from cylinder portion to prevent flux material being moved into the nozzle portion.

4. In a welding gun; a cylindrical portion having a transparent end wall, a tubular nozzle portion connected to the cylindrical portion and extending substantially radially therefrom, a tubular socket element connected to said cylindrical portion at a point spaced circumferentially in one direction from said nozzle portion less than 180° for receiving the end of a welding cable, guide means for wire extending from the region of the outer end of the nozzle portion through said nozzle portion and arcuately through said cylindrical portion to said cable for guiding wire from the cable to the weld region, a flux supply conduit connected to said cylindrical portion at a point spaced from said nozzle portion in said one direction and between the nozzle portion and said tubular element for the supply of flux and vehicle air to said cylindrical portion, apertures in the cylindrical portion substantially opposite the nozzle portion for the escape of vehicle air from the cylindrical portion, said flux flowing down the nozzle portion by gravity when the gun is in use with the nozzle portion extending downwardly and the flow of flux being interrupted when the nozzle portion is tilted upwardly by the escape of vehicle air from said apertures.

5. In a welding gun; a cylindrical portion having a transparent end wall, a tubular nozzle portion connected to the cylindrical portion and extending substantially radially therefrom, a tubular socket element connected to said cylindrical portion to a point spaced circumferentially in one direction from said nozzle portion less than 180° for receiving the end of a welding cable, guide means for wire extending from the region of the outer end of the nozzle portion through said nozzle portion and arcuately through said cylindrical portion to said cable for guiding wire from the cable to the weld region, a flux supply conduit connected to said cylindrical portion at a point spaced from said nozzle portion in said one direction and between the nozzle portion and said tubular element for the supply of flux and vehicle air to said cylindrical portion, apertures in the cylindrical portion substantially opposite the nozzle portion for the escape of vehicle air from the cylindrical portion, said flux flowing down the nozzle portion by gravity when the gun is in use with the nozzle portion extending downwardly and the flow of flux being interrupted when the nozzle portion is tilted upwardly by the escape of vehicle air from said apertures, said wire guide means comprising a tubular element having a reverse bend therein in the nozzle portion for straightening out the wire after it passes along the arcuate portion of the guide means.

6. In a welding gun; a cylindrical portion having a transparent end wall, a tubular nozzle portion connected to the cylindrical portion and extending substantially radially therefrom, a tubular socket element connected to said cylindrical portion at a point spaced circumferentially in one direction from said nozzle portion less than 180° for receiving the end of a welding cable, guide means for wire extending from the region of the outer end of the nozzle portion through said nozzle portion and arcuately through said cylindrical portion to said cable for guiding wire from the cable to the weld region, a flux supply conduit connected to said cylindrical portion at a point spaced from said nozzle portion in said one direction and between the nozzle portion and said tubular element for the supply of flux and vehicle air to said cylindrical portion, apertures in the cylindrical portion substantially opposite the nozzle portion for the escape of vehicle air from the cylindrical portion, said flux flowing down the nozzle portion by gravity when the gun is in use with the nozzle portion extending downwardly and the flow of flux being interrupted when the nozzle portion is tilted upwardly by the escape of vehicle air from said apertures, said wire guide means terminating in a rigid hollow wire guide element detachably carried by said guide means at the end of the nozzle portion.

7. A welding gun according to claim 6 in which said guide element is a non-conductive ceramic material.

8. A welding gun according to claim 6 in which said guide element is metallic.

9. In a welding gun; a cylindrical portion having a transparent end wall, a tubular nozzle portion connected to the cylindrical portion and extending substantially radially therefrom, a tubular socket element connected to said cylindrical portion at a point spaced circumferentially in one direction from said nozzle portion less than 180° for receiving the end of a welding cable, guide means for wire extending from the region of the outer end of the nozzle portion through said nozzle portion and arcuately through said cylindrical portion to said cable for guiding wire from the cable to the weld region, a flux supply conduit connected to said cylindrical portion at a point spaced from said nozzle portion in said one direction and between the nozzle portion and said tubular element for the supply of flux and vehicle air to said cylindrical portion, apertures in the cylindrical portion substantially opposite the nozzle portion for the escape of vehicle air from the cylindrical portion, said flux flowing down the nozzle portion by gravity when the gun is in use with the nozzle portion extending downwardly and the flow of flux being interrupted when the nozzle portion is tilted upwardly by the escape of vehicle air from said apertures, said nozzle portion having a first rigid part adjacent said cylindrical portion, a second rigid part adjacent the outer end, and a flexible sleeve interconnecting said parts.

10. In a welding gun; a cylindrical portion having a transparent end wall, a tubular nozzle portion connected to the cylindrical portion and extending substantially radially therefrom, a tubular socket element connected to said cylindrical portion at a point spaced circumferentially in one direction from said nozzle portion less than 180° for receiving the end of a welding cable, guide means for wire extending from the region of the outer end of the nozzle portion through said nozzle portion and arcuately through said cylindrical portion to said cable for guiding wire from the cable to the weld region, a flux support conduit connected to said cylindrical portion at a point spaced from said nozzle portion in said one direction and between the nozzle portion and said tubular element for the supply of flux and vehicle air to said cylindrical portion, apertures in the cylindrical portion substantially opposite the nozzle portion for the escape of vehicle air from the cylindrical portion, said flux flowing down the nozzle portion by gravity when the gun is in use with the nozzle portion extending downwardly and the flow of flux being interrupted when the nozzle portion is tilted upwardly by the escape of vehicle air from said apertures, said nozzle portion having a first rigid part adjacent said cylindrical portion, a second rigid part adjacent the outer end, and a flexible adjustable sleeve interconnecting said parts.

References Cited by the Examiner

UNITED STATES PATENTS

| | | | |
|---|---|---|---|
| 2,189,399 | 2/40 | Lewbers | 219—124 |
| 2,536,294 | 1/51 | Landis et al. | 314—74 |
| 2,778,910 | 1/57 | Landis et al. | 219—130 |
| 3,025,387 | 3/62 | Kinney | 219—130 |
| 3,060,307 | 10/62 | Arnoldy | 219—130 |

FOREIGN PATENTS 799,330  8/58  Great Britain.

RICHARD M. WOOD, *Primary Examiner.*